US007466058B2

(12) United States Patent
Dubois et al.

(10) Patent No.: US 7,466,058 B2
(45) Date of Patent: Dec. 16, 2008

(54) TRANSVERSE FLUX ELECTRICAL MACHINE WITH SEGMENTED CORE STATOR

(75) Inventors: Maxime R. Dubois, Levis (CA); Henk Polinder, Pijnacker (NL)

(73) Assignee: Eocycle Technologies, Inc., Levis (Quebec) (CA)

( * ) Notice: Subject to any disclaimer, the term of this patent is extended or adjusted under 35 U.S.C. 154(b) by 0 days.

(21) Appl. No.: 11/476,475

(22) Filed: Jun. 28, 2006

(65) Prior Publication Data

US 2007/0013253 A1 Jan. 18, 2007

Related U.S. Application Data

(60) Provisional application No. 60/694,695, filed on Jun. 29, 2005.

(51) Int. Cl.
*H02K 1/12* (2006.01)
*H02K 1/14* (2006.01)

(52) U.S. Cl. ...................................... 310/257; 310/216

(58) Field of Classification Search ................. 310/216, 310/218, 254, 257, 75 C, 263
See application file for complete search history.

(56) References Cited

U.S. PATENT DOCUMENTS 2,243,318 A * 5/1941 Rawlings .................... 310/263
4,255,684 A * 3/1981 Mischler et al. ............. 310/216
5,051,641 A 9/1991 Weh
5,607,525 A * 3/1997 Gay .......................... 156/62.8
5,828,145 A * 10/1998 Nakamura ................ 310/67 A
6,133,669 A * 10/2000 Tupper ....................... 310/263
6,201,324 B1 * 3/2001 Suzuki et al. ................. 310/57
6,605,884 B2 * 8/2003 Nishimoto ................ 310/67 A
6,924,569 B2 * 8/2005 Endo et al. ................ 310/67 A
6,946,771 B2 * 9/2005 Cros et al. .................. 310/257
7,199,500 B2 * 4/2007 Yoshida ...................... 310/257
2004/0007938 A1 * 1/2004 Endo .......................... 310/263
2005/0040720 A1 2/2005 Dubois

FOREIGN PATENT DOCUMENTS

| | | |
|---|---|---|
| EP | 1 005 136 B1 | 1/2003 |
| WO | WO 97/39515 | 10/1997 |
| WO | WO 03/088454 | 10/2003 |

* cited by examiner

*Primary Examiner*—Tran Nguyen
(74) *Attorney, Agent, or Firm*—Michaelson & Associates; Peter L. Michaelson

(57) ABSTRACT

The invention relates to a transverse flux electrical machine, comprising a rotor and a stator. The rotor has magnets, angularly adjacent magnets having magnetic polarizations of opposite directions. The stator has a plurality of magnetic cores annularly disposed along the stator. Each core comprises a U-shaped part and a magnetic foot. The U-shaped part is disposed such that its open side faces the air gap between the rotor and the stator and that a segment of a magnetic flux circulating in the U-shaped part is substantially parallel to the rotation axis. The magnetic foot is assembled to the U-shaped part such that it is contiguous to the air gap. The magnetic foot provides a magnetic pole. An electrical conductor coil is disposed in the interior area of all of the U-shaped parts.

16 Claims, 7 Drawing Sheets

TRANSVERSE FLUX ELECTRICAL MACHINE WITH SEGMENTED CORE STATOR

CROSS-REFERENCE TO RELATED APPLICATIONS

This application claims priority under 35 USC §119(e) of U.S. provisional patent application No. 60/694,695 filed on Jun. 29, 2005 in the French language by Applicant. Translations of this application in the English language have been made of record. This application and its translation in the English language are incorporated herein by reference.

BACKGROUND OF THE INVENTION

1) Field of the Invention

This invention relates to a transverse flux electrical machine, that can be used as an alternator or a motor, and that is intended to be used for the conversion of a rotary movement into electrical power, and vice versa.

2) Description of the Prior Art

Transverse flux electrical machines include a circular stator and a circular rotor, which are separated by an air space called an air gap, that allows free rotation of the rotor with respect to the stator, and wherein the stator comprises soft iron cores, that direct the magnetic flux in a direction that is mainly perpendicular to the direction of rotation of the rotor. The stator of transverse flux electrical machines also comprises electrical conductors, defining a toroid which is coiled in a direction that is parallel to the direction of rotation of the machine. In this type of machine, the rotor comprises a plurality of identical permanent magnet parts, which are arranged so as to create an alternate magnetic flux in the direction of the air gap. This magnetic flux goes through the air gap with a radial orientation and penetrates the soft iron cores of the stator, which direct this magnetic flux around the electrical conductors.

Certain transverse flux electrical machines include a stator which comprises horseshoe shaped soft iron cores that are oriented in such a manner that the magnetic flux that circulates inside these cores is directed in a direction that is mainly perpendicular to the direction of rotation of the rotor.

The perpendicular orientation of the magnetic flux in the cores of the stator, with respect to the rotation direction, provides a pole pitch typically lower than 20 mm, which gives to transverse flux electrical machines a high ratio of mechanical torque per weight unit of the electrical machine.

In the prior art, the horseshoe shaped soft iron cores are monolithic. Consequently, the horseshoe shaped soft iron cores are opened, i.e. the two ends of the horseshoe are sufficiently remote from one another that the stator coil may be inserted therebetween.

Also, in the prior art, the horseshoe shaped soft iron cores are monolithic and may entirely consist of piled up metal sheets. In this case, it is not possible to machine the stator to ensure its circle symmetry, without short-circuiting the metal sheets with one another. A non-machined stator increases the inaccuracy of the thickness of the air gap between the stator and the rotor. Also, in the case where the horseshoe shaped soft iron cores are made of identical piled up metal sheets, additional magnetic losses are produced inside the horseshoe shaped soft iron cores in the region that is located close to the air gap, the reason being the circumferential component of the magnetic induction B that is produced by the rotor. This circumferential component of the magnetic induction circulates perpendicularly to the plane of the metal sheets constituting the horseshoe shaped soft iron cores and alternates with a frequency that is equal to the electrical frequency of the machine, which generates eddy current losses in the metal sheets.

In the prior art, the horseshoe shaped soft iron cores are monolithic and may be entirely made of a magnetic material that is compacted under high pressure. In this case, the electrical machine thus constituted will result in reduced power efficiency, nominal torque and mechanical tolerance to vibrations, and shocks. Reduction of performances is associated with the presence of a compacted magnetic material whose magnetic permeability, magnetic induction at saturation and mechanical breaking strength are lower than those of the magnetic metal sheets, and whose eddy current losses are more important than those of magnetic metal sheets.

SUMMARY OF THE INVENTION

One aspect of the invention provides a transverse flux electrical machine, comprising: a first element having an axis and magnets disposed along the first element at a uniform radial distance from the axis, angularly adjacent magnets having magnetic polarizations of opposite directions; and a second element concentrically mounted to the first element for relative rotation to one another, the first and the second elements being radially spaced with an air gap, the second element having: a plurality of magnetic cores annularly disposed along the second element, each core comprising a U-shaped part defining an interior area and an open side and a the air gap and that a segment of a magnetic flux circulating in the U-shaped part is substantially parallel to the axis, the first magnetic foot being assembled to the U-shaped part such that the first magnetic foot is contiguous to the air gap, the first magnetic foot for providing a first magnetic pole; and an electrical conductor coil disposed in the interior area of all of the U-shaped parts.

Another aspect of the invention provides a method for manufacturing a component for a transverse flux electrical machine, comprising: fixing a plurality of U-shaped magnetic cores around a rotation axis such that the open side of the U-shaped magnetic cores points in a radial direction; winding an electrical conductor coil such that the coil rests in the interior area of all of the U-shaped cores, the coil being in contact with the inner edge of the U-shaped magnetic cores; and attaching a magnetic foot to at least one end of each one of said U-shaped magnetic cores on the open side to prevent the coil from being removed from its location, thereby providing the component having a plurality of U-shaped magnetic cores with magnetic feet attached thereto and an electrical conductor coil.

Another aspect of the invention provides a transverse flux electrical machine comprising: a first element having an axis and magnets disposed along the first element at a uniform radial distance from the axis, angularly adjacent magnets having magnetic polarizations of opposite directions; and a second element concentrically mounted to the first element for relative rotation to one another, the first and the second elements being radially spaced with an air gap, the second element having: a plurality of magnetic cores annularly disposed along the second element, each core comprising a U-shaped part defining an interior area and an open side and two magnetic feet, the U-shaped part being disposed such that its open side faces the air gap and that a segment of a magnetic flux circulating in the U-shaped part is substantially parallel to the axis, each magnetic foot being assembled to the U-shaped part such that it is contiguous to the air gap, the magnetic feet for providing two magnetic poles; and an electrical conductor coil disposed in the interior area of all of the U-shaped parts; characterized in that each core substantially surrounds the coil.

The invention relates to a transverse flux electrical machine, comprising a rotor and a stator. The rotor has magnets, angularly adjacent magnets having magnetic polarizations of opposite directions. The stator has a plurality of magnetic cores annularly disposed along the stator. Each core comprises a U-shaped part and a magnetic foot. The U-shaped part is disposed such that its open side faces the air gap between the rotor and the stator and that a segment of a magnetic flux circulating in the U-shaped part is substantially parallel to the rotation axis. The magnetic foot is assembled to the U-shaped part such that it is contiguous to the air gap. The magnetic foot provides a magnetic pole. An electrical conductor coil is disposed in the interior area of all of the U-shaped parts.

BRIEF DESCRIPTION OF THE DRAWINGS

The characteristics, aspects and advantages of the present invention mentioned above as well as some others will be better understood by means of the description which follows and of the accompanying drawings, in which.

It will be noted that throughout the appended drawings, like features are identified by like reference numerals.

DETAILED DESCRIPTION OF THE INVENTION

Figure 1:
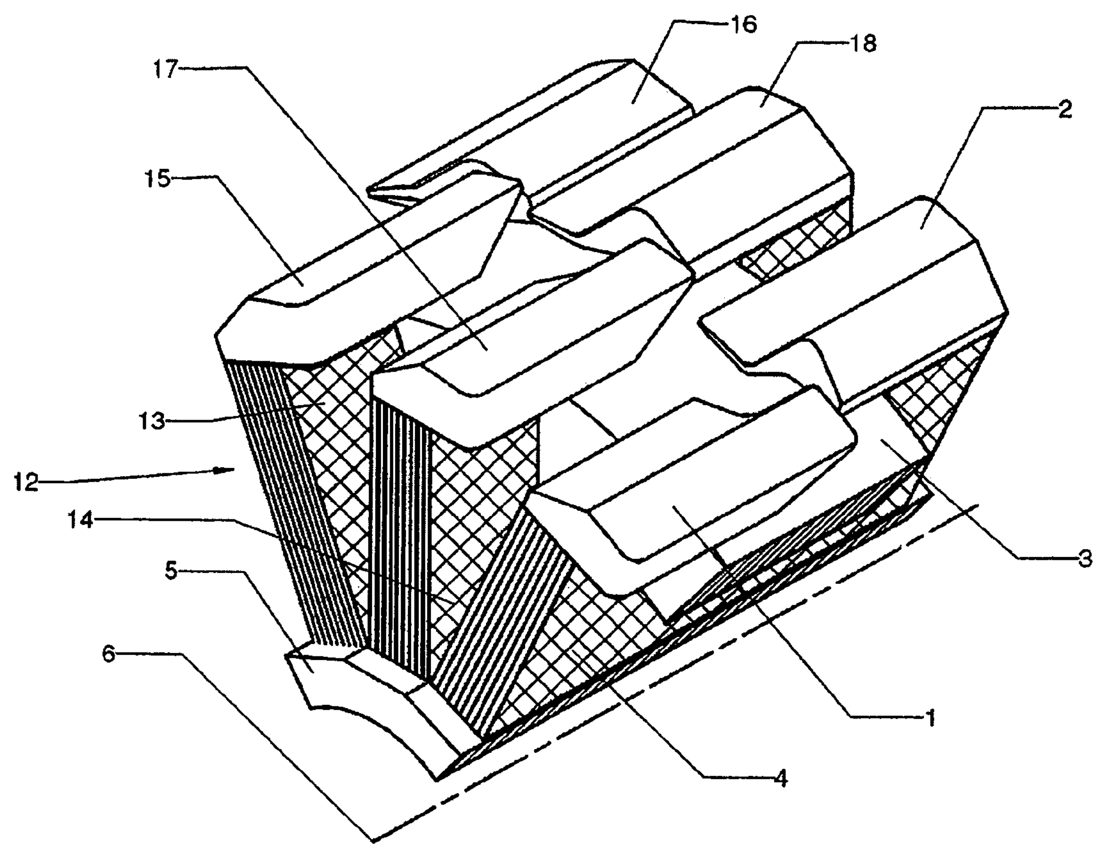
FIG. 1 is a perspective view, showing a section of six poles of the stator of one phase of a transverse flux machine, according to an embodiment of the invention, the elements of the rotor not being illustrated.
Figure 3:
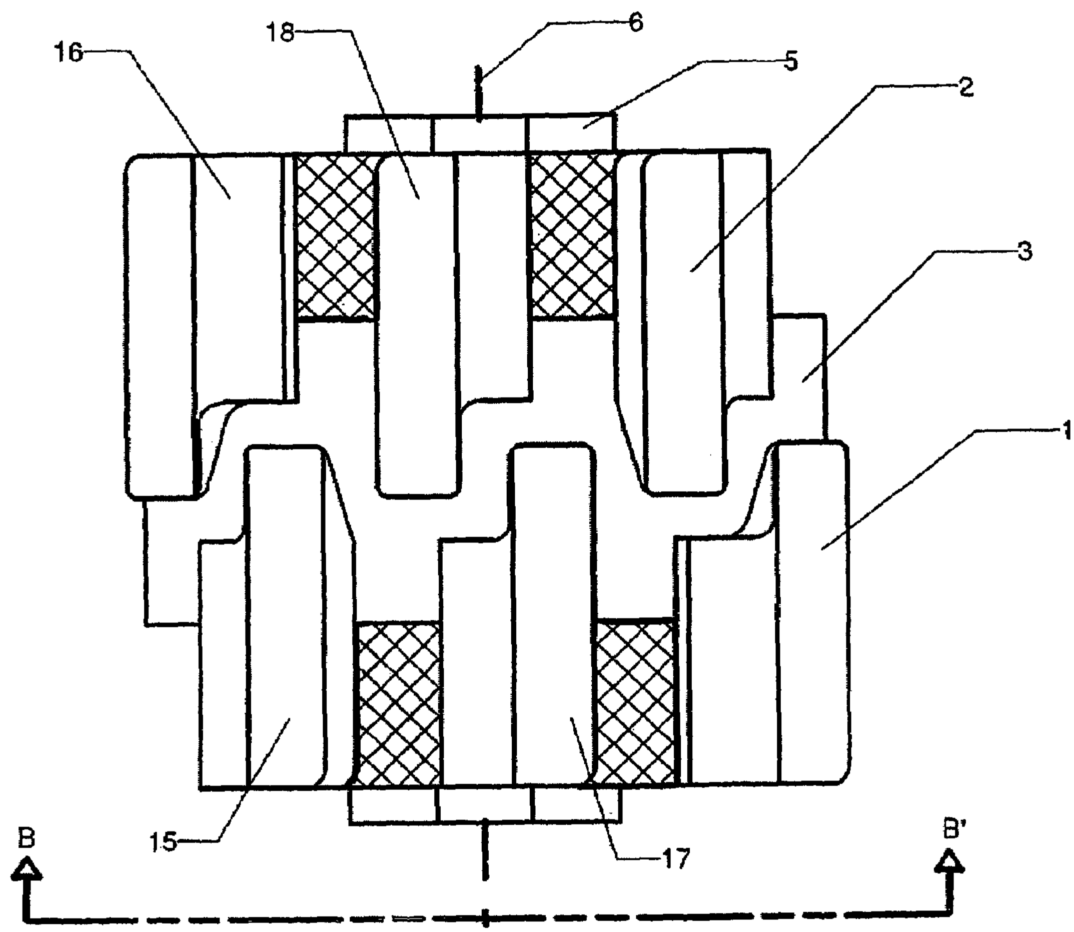
FIG. 3 is a top view of the section of stator of FIG. 1.
Figure 4:
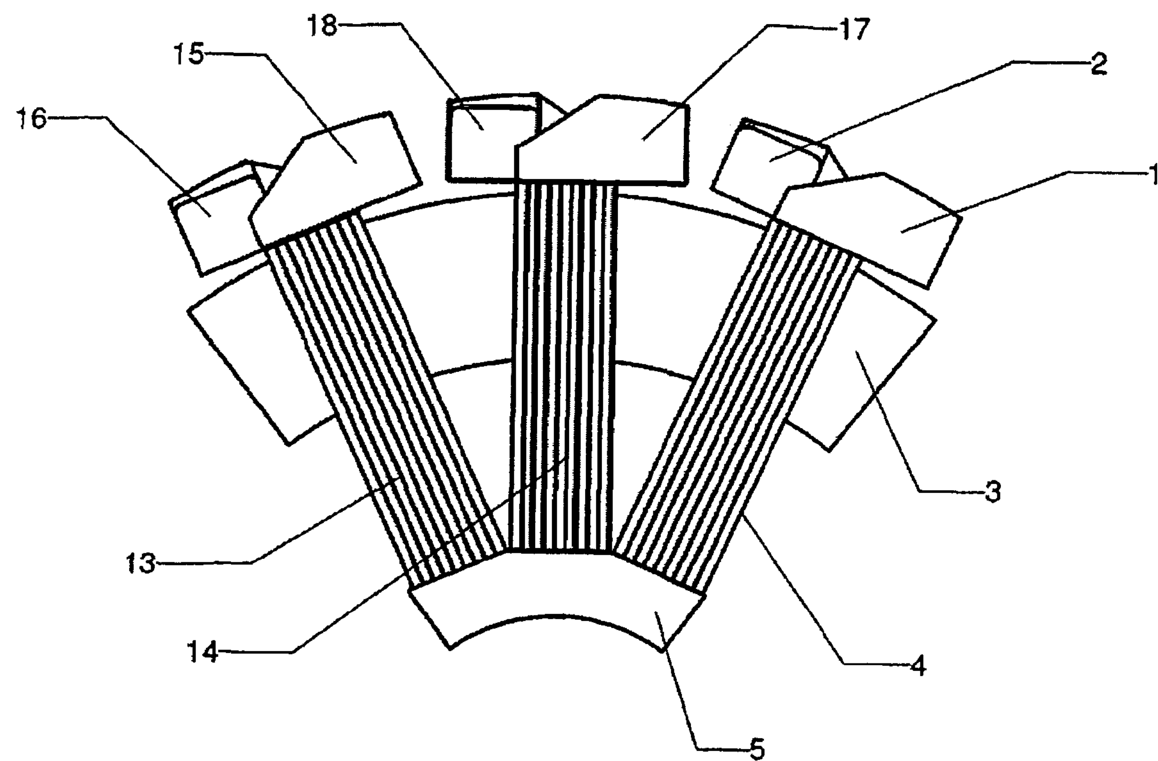
FIG. 4 is a side elevation view of the section of stator of FIG. 1, the elements of the rotor not being illustrated.

In FIGS. 1, 3 and 4 part of stator 12 of a single-phase transverse flux machine according to an embodiment of the invention is illustrated, the rotor not being represented. In this embodiment, the transverse flux machine includes a number of magnetic poles 2*p*, FIGS. 1, 3 and 4 illustrating 6 magnetic poles only among the 2p magnetic poles which are included in a phase of the machine. Three of a number of p magnetic cores are illustrated. Each magnetic core comprises a U-shaped soft iron stator core 4, 13, 14 and two identical magnetic feet 1, 2, 15, 16, 17, 18. The U-shaped soft iron stator cores 4, 13, 14, rest on the holding cylinder of the stator 5 and are held in place by means of the coil of electrical conductors 3 disposed inside the U-shaped soft iron stator cores 4, 13, 14 so that it is wound around the p U-shaped soft iron stator cores. The holding cylinder of the stator is of generally cylindrical shape and is centered on the axis of rotation 6 of the machine. The magnetic feet 1, 2 are disposed at the two ends of the U-shaped soft iron stator core 4 and mutually face one another so as to cover the coil of electrical conductors 3. In the same manner, the magnetic feet 15, 16, 17, 18 are disposed at the two ends of the U-shaped soft iron stator cores 13, 14. Each magnetic foot 1, 2, 15, 16, 17, 18 corresponds to a magnetic pole. The magnetic feet 1, 2, 15, 16, 17, 18 are elements that are distinct and separate from the U-shaped soft iron stator cores 4, 13, 14.

According to an embodiment, the U-shaped soft iron stator cores 4, 13, 14 and the magnetic feet 15, 16, 17, 18 consist of different magnetic material. According to an embodiment, the U-shaped soft iron cores 4, 13, 14 are made from a piling up of magnetic metal sheets, but they may also be made from a magnetic material that is compacted under high pressure. The U-shaped soft iron cores are closed on three sides and are opened on one side, so as to allow for the insertion of the coil therein without difficulty.

The magnetic feet 1, 2, 15, 16, 17, 18 are made from an isotropic magnetic material that is compacted under high pressure, but may also be made from another type of magnetic material. The magnetic feet 1, 2, 15, 16, 17, 18 are positioned at the two ends of the U-shaped soft iron cores 4, 13, 14 that are closest to the air gap and are oriented so as to prevent the coil from being removed from its location. The magnetic feet 1, 2, 15, 16, 17, 18 are positioned in such a manner that they are in contact with the air gap.

The manner used to maintain in place the magnetic feet 1, 2, 15, 16, 17, 18 at the ends of the U-shaped soft iron stator cores 4, 13, 14 can vary. The magnetic feet 1, 2, 15 may for example be glued at the ends of the U-shaped soft iron stator cores 4, 13, 14. The magnetic feet 1, 2, 15 may also be fixed to the ends of the U-shaped soft iron stator cores 4, 13, 14 by means of bolts, screws, or others devices not illustrated in FIG. 1.

It can be seen on FIG. 4 that the two magnetic feet 1, 2, 15, 16, 17, 18 of opposite polarities are angularly offset with respect to one another such that the polarity of the magnetic poles alternates along the stator. The magnetic foot 1 is shaped to deviate the magnetic flux circulating in the U-shaped soft iron stator core 4 and angularly offset the associated magnetic pole in a positive direction. Similarly, the magnetic foot 2 is shaped to deviate the magnetic flux and angularly offset the associated magnetic pole in a negative direction. The magnetic feet 15, 16, 17, 18 are shaped in the same manner.

Figure 2:
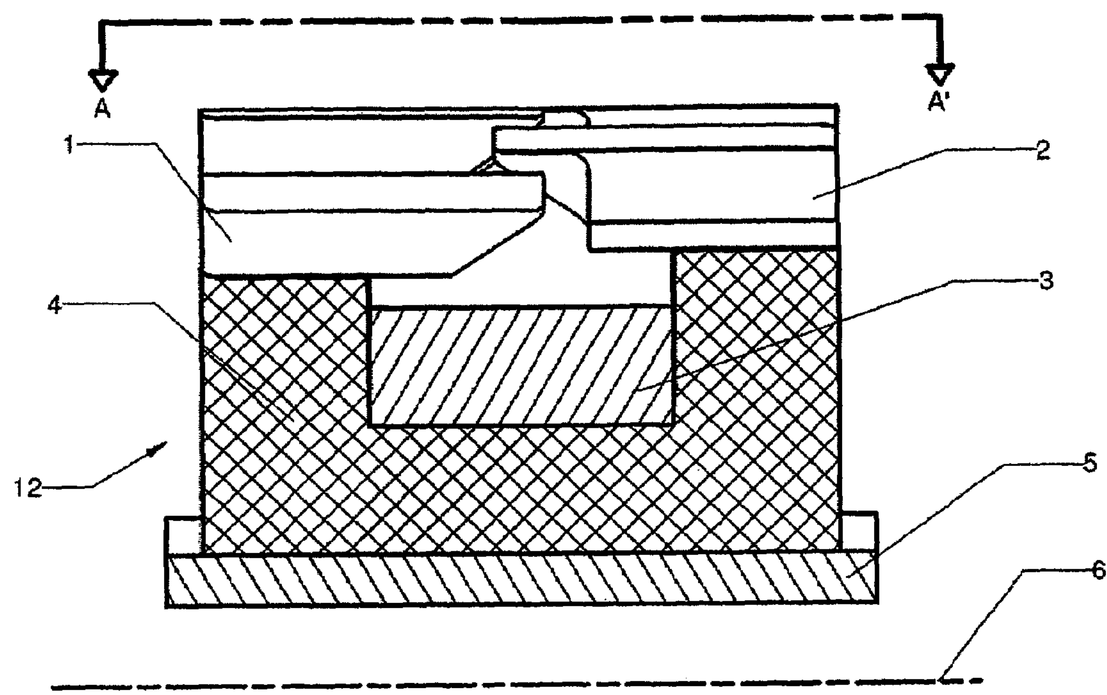
FIG. 2 is a cross-section view in elevation of the section of stator of FIG. 1, the plane of the cross-section being parallel to the axis of rotation, the elements of the rotor not being illustrated.

In FIG. 2, a section of the stator 12 of a single-phase transverse flux machine of an embodiment of the invention is illustrated, the rotor not being represented. The U-shaped soft iron stator core 4 rests against the holding cylinder of stator 5 and is held in place by means of coil 3 of electrical conductors disposed inside the U-shaped soft iron stator core 4. The coil of electrical conductors may be made of a single or a plurality of conductors of flat, square or round cross-section wound in toroid shape around the p U-shaped soft iron stator cores while lying inside the U-shaped soft iron stator cores. In radial direction of the electrical machine, the coil is in contact with the inside edge of the U-shaped soft iron cores 4, 13, 14 and is also limited by the magnetic feet 1, 2, 15, 16, 17, 18. The holding cylinder of the stator is generally of cylindrical shape and is centered on the axis of rotation 6 of the machine. The magnetic feet 1, 2 are disposed at the two ends of the U-shaped soft iron stator core 4 and mutually face one another so as to cover the coil of electrical conductors. The magnetic feet 1, 2 are distinct and separate elements from the U-shaped soft iron stator core 4.

Figure 5:
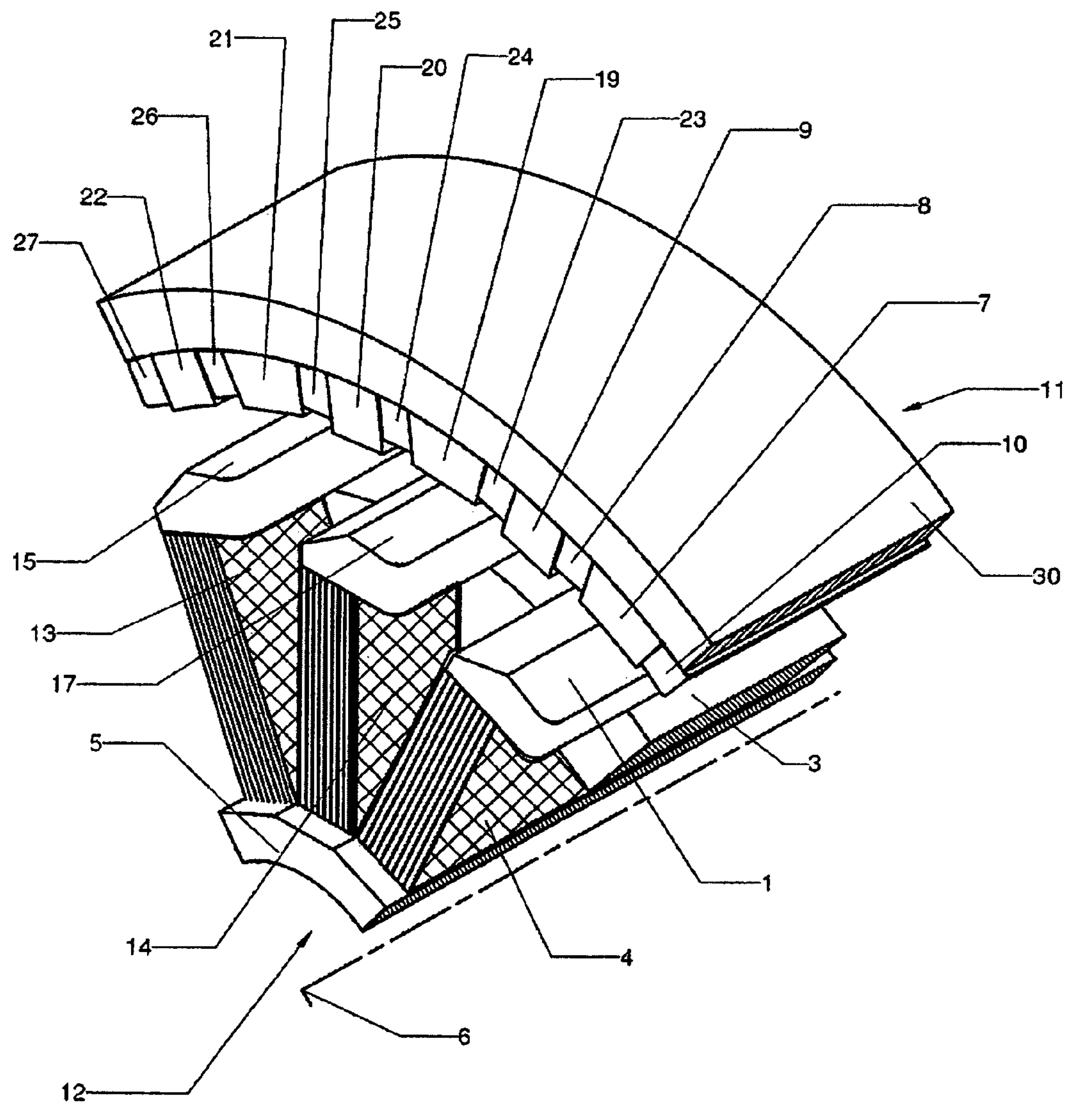
FIG. 5 is a perspective view showing the section of stator of FIG. 1 along with a section of six poles of the rotor, according to an embodiment of the invention.

In FIG. 5, part of rotor 11 and of stator 12 of a single-phase transverse flux machine of an embodiment of the invention, is illustrated. The transverse flux machine of an embodiment of the invention includes a number of magnetic poles 2*p*, FIG. 5 illustrating only 6 magnetic poles among the magnetic poles 2*p* that are included in a phase of the machine. At stator 12, the U-shaped soft iron stator cores 4, 13, 14, rest against the holding cylinder of stator 5, and are held in place by means of the coil of electrical conductors 3 that is inserted inside the U-shaped soft iron stator cores 4, 13, 14. The magnetic feet 1, 17, 15 are each disposed at one end of the U-shaped soft iron stator cores 4, 14, 13 and cover the coil of electrical conductors 3. At rotor 11, an arrangement of magnets 10, 8, 23, 24, 25, 26, 27 and of magnetic flux concentrators 7, 9, 19, 20, 21, 22 is illustrated, the latter representing one of the possible arrangements of the rotor. Rotor 11 is freely rotatable, which allows for its own rotation around an axis of rotation 6. Friction between rotor 11 and stator 12 is prevented through the presence of an air gap between the magnetic flux concentrators 7, 9, 19, 20, 21, 22 and the magnetic feet 1, 17, 15. The magnetic flux concentrators 7, 9, 19, 20, 21, 22 and magnets 10, 8, 23, 24, 25, 26, 27 are fixed to the holding cylinder of rotor 30, the latter being centered on the axis of rotation 6. Other arrangements of magnets and concentrators are also possible. In the arrangement of rotor 11, illustrated in FIG. 5, the number of magnetic flux concentrators 7, 9, 19, 20, 21, 22 placed on the circumference of the rotor 11 is equal to 2p. In the arrangement of rotor 11 illustrated in FIG. 5, the number of magnets 10, 8, 23, 24, 25, 26, 27 placed on the circumference of rotor 11 is equal to 2p and each magnet is magnetized according to a direction that is parallel to the direction of rotation of rotor 11. In the arrangement of rotor 11 illustrated in FIG. 5, each magnet 10, 8, 23, 24, 25, 26, 27 has a magnetization direction that makes an angle of 180 degrees with respect to the magnetization direction of the adjacent magnet, which is located on the other side of the magnetic flux concentrator 7, 9, 19, 20, 21, 22. The magnetic flux concentrators 7, 9, 19, 20, 21, 22 redirects the magnetic flux from the magnets 8, 10, 23, 24, 25, 26, 27 toward the air gap, such that a magnetic pole is provided on each concentrator 7, 9, 19, 20, 21, 22. The rotor 11 comprises a single ring of magnets 10, 8, 23, 24, 25, 26, 27 of alternating polarity along the ring. The single ring of magnets is made possible by the angular offset between the magnetic feet 1 and 2. Alternatively, if there is no angular offset between the two magnetic feet 1, 2, 15, 16, 17, 18 of each U-shaped soft iron stator cores 4, 13, 14, two rings of magnets can be used, the polarity of a magnet of the first ring being opposed to the polarity of a magnet located at a same angular position on the second ring. The rotor 11 is disposed on one side only of the stator 23. By its rotation, the rotor 11 produces an alternate induction field B in the stator cores.

Figure 6:
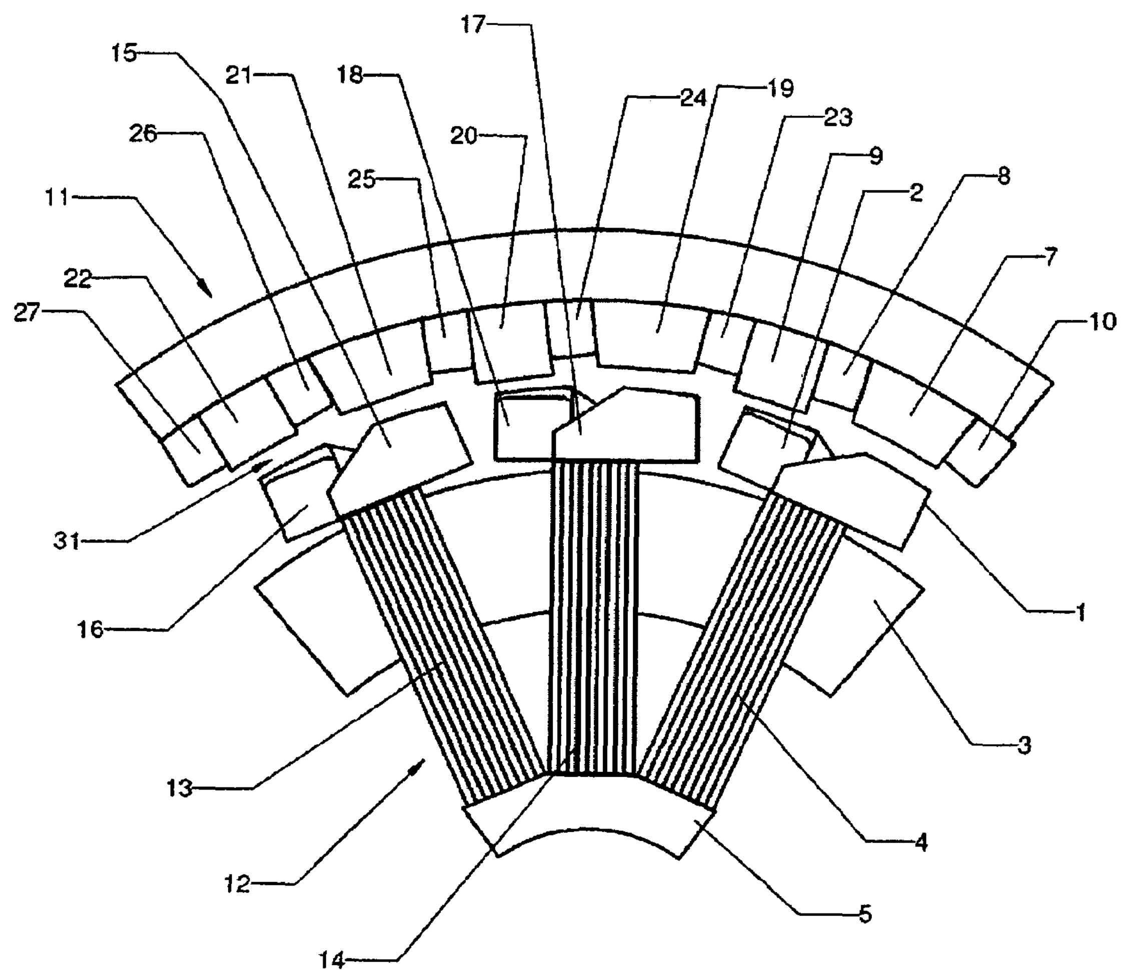
FIG. 6 is a side elevation view of the section of stator and the section of rotor of FIG. 5.

In FIG. 6, the transverse flux machine according to an embodiment of the invention is illustrated in an arrangement where the stator 12 is disposed at a shorter distance from the axis of rotation 6 of the machine in axial direction, than rotor 11. Rotor 11 is exterior to and rotates around stator 12, which is inside the rotor. The electrical connections of the stator pass through the shaft of the stator, the latter being fixed. An air gap 31 is provided between the magnetic flux concentrators 7 and 9 and the magnetic feet 1 and 2.

Figure 7:
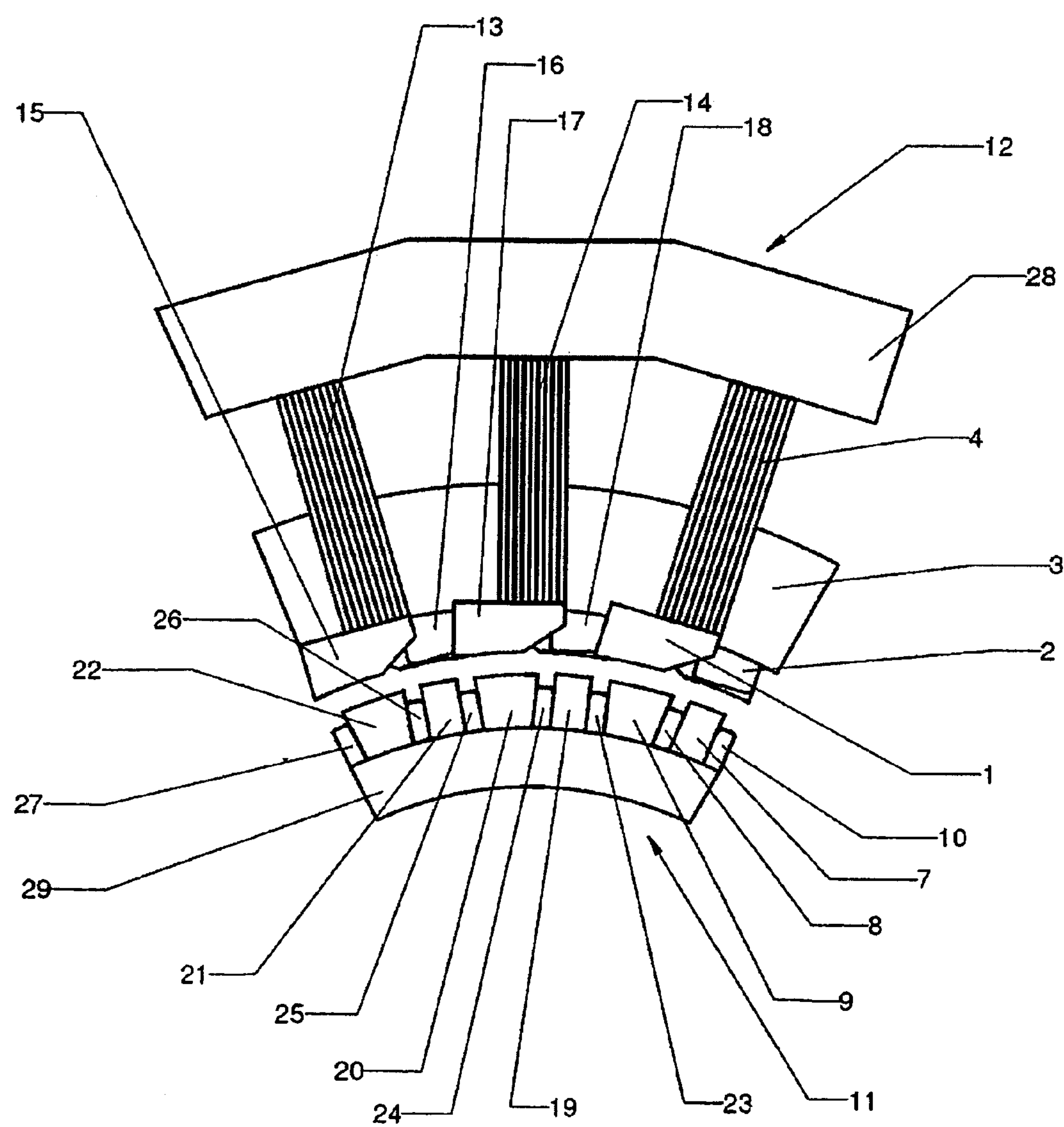
FIG. 7 is a side elevation view of a section of stator and a section of rotor according to another embodiment of the invention wherein the transverse flux machine is an interior rotor machine.

In FIG. 7, the transverse flux machine of another embodiment of the invention is illustrated in an arrangement where the stator 12 is disposed at a greater distance from the axis of rotation 6 of the machine in radial direction, than rotor 11. The stator elements are held by stator support cylinder 28, which is held fixed. The electrical connections are accessible from the exterior of the machine through an opening provided locally through the stator support cylinder 28. The rotor elements are held by rotor support cylinder 29, which carries out rotations around the axis of rotation 6.

One skilled in the art will appreciate that the weight torque of the machine is improved by the presence of magnetic feet placed at the ends of the horseshoe shaped soft iron cores. Magnetic feet are elements that are distinct from the horseshoe shaped soft iron core. In an embodiment of the invention, there is provided two magnetic feet per horseshoe shaped soft iron core. The magnetic feet are placed in such a manner that they close the coil window after the coil has been inserted therein. The magnetic feet are directly in contact with the air gap and consequently, they allow for an increase of the surface of the stator that is in contact with the air gap. The result is a weaker magnetic reluctance between the rotor and the stator and consequently a higher magnetic flux value from the rotor is picked up by the stator, which increases the nominal torque of the machine.

In an embodiment of the invention, the magnetic feet are made of an isotropic powdered magnetic material that is compacted under high pressure which importantly reduces the losses of Fe, that are associated with the circumferential component of the induction field B produced near the air gap by the movement of the rotor. Additionally, in an embodiment of the invention, the horseshoe shaped soft iron cores are made of piled up magnetic sheets, which makes it possible to obtain a machine that possesses a nominal torque with a higher value and a higher power efficiency than would be the case if the horseshoe shaped soft iron cores would be made of powdered magnetic material that is compacted under high pressure.

In an embodiment of the invention, the method for manufacturing an element for a transverse flux electrical machine comprises the following steps: providing a plurality of U-shaped soft iron stator cores while closing three sides thereof and allowing one side to remain opened; disposing the plurality of U-shaped soft iron stator cores around an axis of rotation; winding a coil of electrical conductors, defining a toroid, the latter being disposed peripherally in the inner part of all the U-shaped soft iron stator cores, said toroid being in contact with the inner edge of the U-shaped soft iron stator cores; providing a plurality of magnetic feet; and placing said magnetic feet at the ends of the U-shaped soft iron stator cores on the open side thereof to prevent the coil from being removed from its location.

According to this embodiment, a coil is inserted inside all the U-shaped soft iron cores, before installing the magnetic feet.

According to an embodiment, the stator is machined after installing the magnetic feet. Machining of the stator is a mechanical operation consisting in removing all excess material from the stator in order to obtain a uniform radius of the stator at the level of the air gap.

One way to remove all material excess is to place the stator on a lathe and then remove thicknesses of material from the magnetic feet until obtaining a uniform radius, once the coil is wound, so as to make sure that an air gap is provided, having a dimension that is as constant as possible with respect to the central axis.

It is contemplated that the two magnetic feet may not be identical.

According to an alternative embodiment of the invention, each magnetic core comprises a single magnetic foot that is disposed on a first end of the U-shaped soft iron core to provide a first magnetic pole. A second magnetic pole is provided on the second end of the U-shaped soft iron core with no magnetic foot thereon. The magnetic foot may deviate the magnetic field circulating in the U-shaped soft iron core so that the two magnetic poles are angularly offset with respect to one another, the polarity of the magnetic poles thus alternating along on the stator. The first end of the U-shaped soft iron core is shorter than the second end such that, when the magnetic foot is attached to the first end, the two magnetic poles are at the same radial distance and in contact with the air gap.

According to another embodiment, an electrical apparatus comprising a plurality of transverse flux electrical machines may be produced, the machines being adjacent one another in axial orientation, and sharing a common rotation axis.

The embodiments of the invention described above are intended to be exemplary only. The scope of the invention is therefore intended to be limited solely by the scope of the appended claims.

What is claimed is:

1. A transverse flux electrical machine comprising:

a first element having an axis and magnets disposed along said first element at a uniform radial distance from said axis, angularly adjacent ones of said magnets having magnetic polarizations of opposite directions; and a second element concentrically mounted to said first element for relative rotation to one another, said first and said second elements being radially spaced with an air gap, said second element having:

a plurality of magnetic cores annularly disposed along said second element, each one of said cores comprising:

a U-shaped part comprising an end segment substantially parallel to said axis and two radially extending arm segments, said arm segments being substantially angularly aligned from one another, said U-shaped part defining an interior area and an open side and being disposed such that said open side faces said air gap;

a first magnetic foot assembled to an end of one of said arm segments such that said first magnetic foot is contiguous to said air gap to provide a first magnetic pole, said first magnetic foot and said U-shaped part being made of different materials;

a second magnetic pole at an end of the other one of said arm segments and contiguous to said air gap; and wherein said first magnetic foot is shaped such that it deviates a magnetic flux circulating in said U-shaped part so that said first magnetic pole and said second magnetic pole are angularly offset from one another with respect to said axis; and an electrical conductor coil disposed in said interior area of all of the U-shaped parts.

2. The transverse flux electrical machine as claimed in claim 1, wherein said magnets are longitudinally aligned on said first element so as to create a single ring of magnets per phase of said electrical machine.

3. The transverse flux electrical machine as claimed in claim 1, wherein said first element is disposed on one radial side only of said second element.

4. The transverse flux electrical machine as claimed in claim 1, wherein said U-shaped part is made from a material comprising a pile of magnetic metal sheets.

5. The transverse flux electrical machine as claimed in claim 1, wherein said magnetic foot is made of a material comprising a compacted isotropic powder magnetic material.

6. The transverse flux electrical machine as claimed in claim 1, wherein said first element comprises a rotor.

7. The transverse flux electrical machine as claimed in claim 1, further comprising a second magnetic foot assembled to an end of the other one of said arm segments to provide said second magnetic pole.

8. A transverse flux electrical machine, comprising:

a first element having an axis and magnets disposed along said first element at a uniform radial distance from said axis, angularly adjacent ones of said magnets having magnetic polarizations of opposite directions;

a second element concentrically mounted to said first element for relative rotation to one another, said first and said second elements being radially spaced with an air gap, said second element comprising:

a plurality of magnetic cores annularly disposed along said second element, each one of said cores comprising:

a U-shaped part defining an interior area, a first end and a second end, said U-shaped part being disposed such that said first end and said second end face said air gap and that a segment of a magnetic flux circulating in said U-shaped part is substantially parallel to said axis, said U-shaped part being made of a pile of substantially planar magnetic metal sheets;

a first magnetic foot assembled to said first end such that said first magnetic foot is contiguous to said air gap to define a first magnetic pole, said first magnetic foot and said U-shaped part being made of different materials;

a second magnetic pole at said second end and contiguous to said air gap; and wherein said first magnetic foot is shaped such that it angularly deviates a magnetic flux circulating in said U-shaped part so that said first magnetic pole and said second magnetic pole are angularly offset from one another with respect to said axis; and an electrical conductor coil disposed in said interior area of all of the U-shaped parts.

9. The transverse flux electrical machine as claimed in claim 8, wherein said cores further comprises a second magnetic foot joined to said second end of said U-shaped part such that said second magnetic foot is contiguous to said air gap, said second magnetic foot for providing said second magnetic pole.

10. The transverse flux electrical machine as claimed in claim 8, wherein said magnets are longitudinally aligned on said first element so as to create a single ring of magnets per phase of said electrical machine.

11. The transverse flux electrical machine as claimed in claim 8, wherein said first element is disposed on one radial side only of said second element.

12. The transverse flux electrical machine as claimed in claim 8, wherein said U-shaped part is made of a material comprising soft iron.

13. The transverse flux electrical machine as claimed in claim 8, wherein said magnetic foot is made of a material comprising a compacted powder magnetic material.

14. The transverse flux electrical machine as claimed in claim 13, wherein said magnetic material comprises an isotropic material.

15. The transverse flux electrical machine as claimed in claim 8, wherein said first element comprises a rotor.

16. An electrical apparatus comprising a plurality of transverse flux electrical machines according to claim 8, said electrical machines being placed side by side in axial orientation;

said electrical machines sharing a common axis.

* * * * *